Patented Dec. 3, 1946

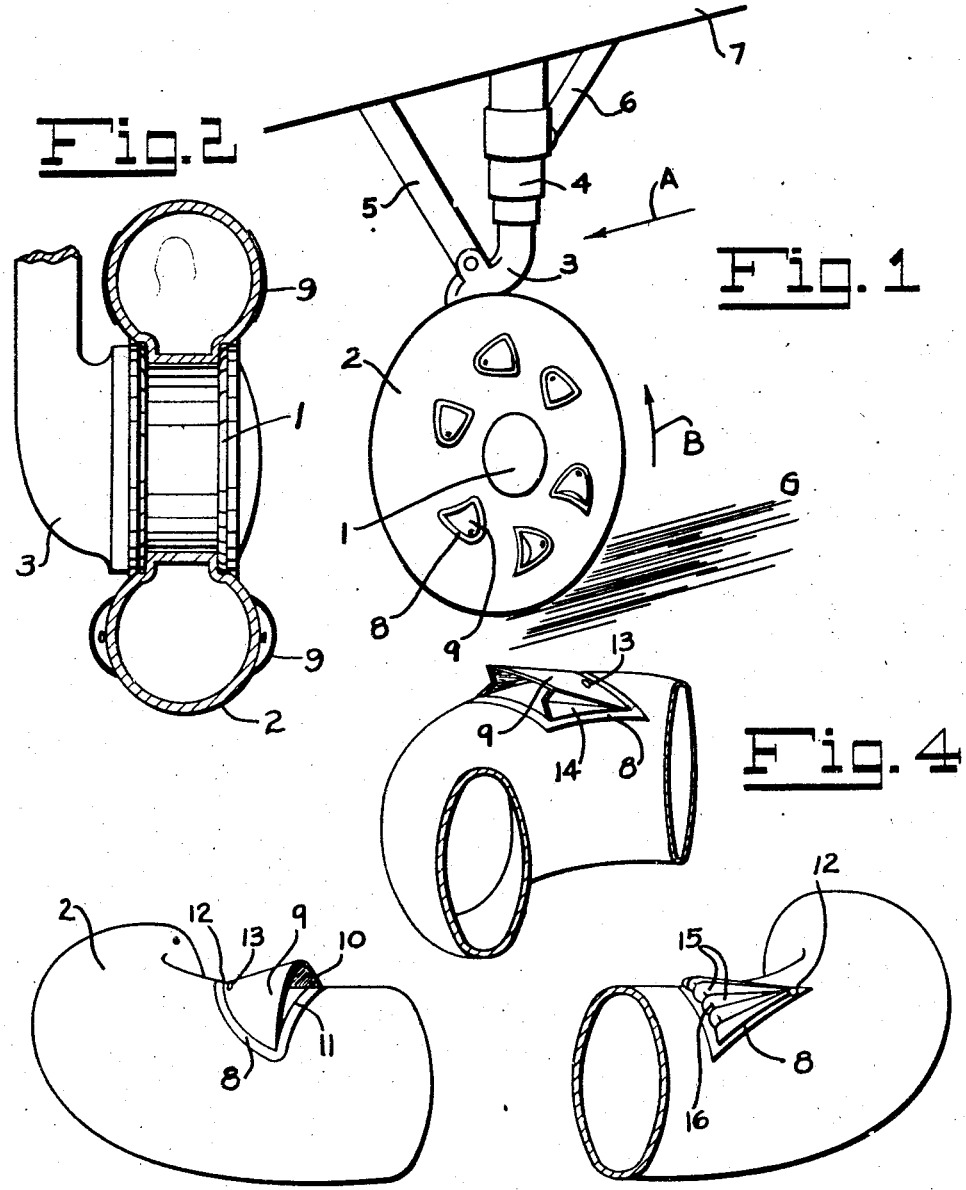

2,412,033

UNITED STATES PATENT OFFICE 2,412,033

TIRE PREROTATING DEVICE

Bernard L. Crosby, Seattle, Wash.

Application March 23, 1942, Serial No. 435,767

1 Claim. (Cl. 244—103)

The tires and wheels of an airplane landing gear, landing at high rates of speed, must acquire a high rotational speed by ground contact, from zero to that which corresponds to the landing speed, in the space of a second or so. This produces extreme abrasion and wear on the tires, which of itself is undesirable, but which in addition may produce destruction of the tire on landing, which consequent damage to the airplane and almost certain injury to its occupants.

It is proposed, therefore, to apply to the tire devices which will catch the relative wind, and act as vanes to start the tire and wheel to rotating prior to ground contact, reducing by so much the work necessary to be done by and at the instant of the ground contact in effecting rotation of the wheel. If the wheel can be set to rotating at the speed it would acquire by ground contact, there remains no work to be done, and theoretically no wear on the tire is brought about by ground contact. If the wheel, by means of these pre-rotating devices, does not reach the speed of ground contact, nevertheless it reaches some percentage of that speed, and by so much the work necessary to be done, and the wear on the tire occasioned by ground contact, is thereby reduced.

In addition to the desirability of effecting pre-rotation of the tire and wheel it is further desirable that the means to accomplish this end be such as will not materially affect the flexibility or squashing of the tire under the impact of landing or under the deflections of taxying; that the device be light in weight, simple in construction, and relatively inexpensive; that it be easily applicable either to new tires or preferably also to tires now in use, as by cementing or vulcanization.

It is also desirable that the device be capable of collapsing at such times as its opening is away from the direction of the relative wind, so that it will to a minimum extent impede the rotation commenced when it faces forwardly in the direction of the relative wind. Similarly it is desirable that it have some tendency to open, and that its collapse under such circumstances as those above be caused by the relative wind, when it faces rearwardly thereof.

It is also desirable that the device be self-cleaning or self-draining, as, for instance, to permit immediate drainage of rain water which might tend to collect, or of mud, which might enter between such a vane and the tire.

It is also desirable that it approximate streamlined shape, so that, as in the rotation of the wheel its closed side is forwardly, it will create a minimum of resistance to forward progress and to rotation of the wheel.

The attainment of the above objects constitutes the aim of this invention, which is shown in the accompanying drawings in a form which is now preferred by me, and, as well, in modified forms.

My invention comprises the novel pocket and assembly thereof upon a wheel or tire, and the novel arrangement thereof and of its several parts, all as shown in the drawing, and as will be hereinafter more fully described and claimed.

Figure 1 is a perspective view, illustrating my device applied to a conventional tire upon a conventional airplane landing gear at about the instant of first contact with the ground.

Figure 2 is a cross section through such a tire, mounted upon a wheel, and depending from a landing gear strut.

Figure 3 is a perspective view of the preferred form of the invention, as applied to a tire section, and Figures 4 and 5 are similar views showing modified forms of the invention.

The landing gear and tire, as shown in the accompanying drawing, is intended to be merely conventional. Thus the wheel 1 carries the tire 2, and is mounted upon a fitting 3 at the lower end of a shock strut 4. The latter is braced laterally by the lateral strut 5 and longitudinally by the drag strut 6. The struts 4, 5, and 6 are suitably connected to and supported from the airplane structure indicated at 7.

In landing, with the airplane proceeding in the direction of the arrow A, contact of the ground G by the tire 2 will effect rotation of the tire and wheel in the direction of the arrow B. It is therefore desired, by the vanes to be described, to effect pre-rotation of the wheel and tire in the same direction, and to effect their rotation at a speed which (ideally) is identical with the rotational speed at ground contact, or which approaches as nearly that speed as may be feasible.

To this end I provide attachments for application to the side wall portion of the tire 2 on one or both sides, consisting, in the preferred form, of a base 8, which may be applied like an external patch by cementing or by vulcanization, which carries, preferably as an integral part of it, a pocket 9. Preferably the materials of which the base and pocket are made are quite flexible. For instance, a stout fabric will serve, and this may be rubberized for protection against moisture, for application by cementing or vulcanization to the tire, and to render the pocket relatively impervious to the relative air stream. It is preferred that the pocket be generally triangular in shape, and that its open side 10 be somewhat longer than the corresponding side 11 of the base 8, wherefore the pocket, by its inherent stiffness, tends somewhat to stand open, yet it can be collapsed by reasonable air pressure from the apex 12 towards the open side 10. Regardless of its stiffness, when its open side 10 is forward to the relative air stream, the relative air stream will tend to open the pocket.

It is desirable to permit some leakage of air from the apex, for air movement through the pocket tends to prevent the building up of a streamlining pressure space in advance of its open side 10, and thereby causes an improved effect tending to rotate the wheel. I therefore provide an aperture 13 adjacent the apex, which can be defined and protected by a grommet, if desired. This serves the further purpose of providing an aperture for drainage from the bottom of the pocket.

It is believed it will be clear that a wheel thus equipped, having a plurality of such pockets angularly spaced about its periphery or about one or both of its side wall portions, as illustrated in Figure 1, will tend to be rotated by the lower pockets catching the wind, and the wheel will be started rotating in the direction of the arrow B. As the pockets reach the upper portion of the wheel in their rotation they are collapsed by the relative wind, and thereby produce little drag, but other pockets, which formerly were uppermost and collapsed, have now reached the lowermost portion of the wheel, and have now been opened, either by their inherent tendency to open or by the relative wind, or both, and these tend to increase the rotational speed. Upon landing, these pockets, being of flexible material, flex and squash with the tire, and do not appreciably affect its proper functioning.

Such pockets may be formed, not triangularly, but of other shapes, for instance of rectangular shape in elevation, as shown in Figure 4. This pocket, designated 9', is provided with collapsible side bellows folds, as indicated at 14, whereby it may collapse and lie flat when opposing the relative wind.

In another form, shown in Figure 5, the air scoop may be made up of relatively rigid elements, combined in such a way that they do not, in the aggregate, materially affect the flexibility of the tire. Thus, for instance, the blades 15, which may be sheet metal or similar stiff material, are connected together at the apex 12 similarly to a fan, and are held in spread relation opposite the apex by the cord 16. Thus held, they may collapse flat against the tire, and may participate in the flexure of the side wall portion, yet to the extent limited by the cord 16 they may stand out from the side wall of the tire, as sails, to catch the relative air stream.

While the pocket 9 has been described as an attachment, it is not outside the present invention to incorporate it as an integral part of the tire. As an attachment, however, it is easily made and applied, and the expense of the whole assembly is the least; likewise it can be attached to tires already in use, or detached from tires to be replaced, and salvaged for reuse. For such reasons the separate, attached form has certain advantages, and is preferred.

What I claim as my invention is:

A tire pre-rotating device for airplane landing gears, comprising a plurality of patches spaced circumferentially around a side wall of the tire, each patch including a base sheet adhesively joined contiguously over its entire area to the tire, and a single pocket only carried by the base sheet, normally self-sustaining in open position, and incorporating a pocket sheet of flexible material having its edges meeting said base sheet well inwardly from the base sheet edges to leave exposed a marginal portion thereof of substantial width, one edge of such pocket being free and of a length greater than the intercept on said base sheet between the ends of such edge, said pocket sheet being made of material sufficiently stiff to stand away from the base sheet for forming an opening facing opposite to the direction of tire rotation to catch the relative air stream throughout a substantial part of each rotation of the tire, but the material of the pocket sheet being sufficiently limp to render the pocket collapsible substantially flat against the base sheet by flow of air of the relative air stream over the tire throughout the remainder of such rotation during flight of the airplane, and said pocket sheet having a small aperture through the edge portion thereof remote from said unsecured edge, operable, when such unsecured pocket edge is at the upstream side of the pocket, for scavenging therethrough foreign material collected in such pocket impelled by the force of air blowing between said base sheet and said pocket sheet and out through such aperture, to clear the pocket.

BERNARD L. CROSBY.